(12) United States Patent
Nagamitsu

(10) Patent No.: US 11,995,433 B2
(45) Date of Patent: May 28, 2024

(54) CENTER, UPDATE CONTROL METHOD, NON-TRANSITORY STORAGE MEDIUM, AND OTA MASTER

(71) Applicant: TOYOTA JIDOSHA KABUSHIKI KAISHA, Toyota (JP)

(72) Inventor: Shoichi Nagamitsu, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 100 days.

(21) Appl. No.: 17/729,062

(22) Filed: Apr. 26, 2022

(65) Prior Publication Data
US 2022/0365768 A1 Nov. 17, 2022

(30) Foreign Application Priority Data
May 13, 2021 (JP) ................. 2021-081819

(51) Int. Cl.
*G06F 8/65* (2018.01)
*G06F 8/41* (2018.01)
*G07C 5/00* (2006.01)

(52) U.S. Cl.
CPC ............. *G06F 8/65* (2013.01); *G06F 8/433* (2013.01); *G07C 5/008* (2013.01)

(58) Field of Classification Search
CPC ............. G06F 8/60; G06F 8/61; G06F 8/65
See application file for complete search history.

(56) References Cited

U.S. PATENT DOCUMENTS

| 2018/0048473 A1* | 2/2018 | Miller ..................... H04L 9/30 |
| 2021/0064509 A1* | 3/2021 | Franke ................ G06F 11/3664 |
| 2021/0155177 A1 | 5/2021 | Harata et al. |
| 2021/0157570 A1* | 5/2021 | Harata .................... G06F 8/654 |

FOREIGN PATENT DOCUMENTS

| CN | 112543911 A | 3/2021 |
| JP | 2020-004245 A | 1/2020 |

* cited by examiner

*Primary Examiner* — Duy Khuong T Nguyen
(74) *Attorney, Agent, or Firm* — Oliff PLC

(57) ABSTRACT

A center includes one or more processors configured to: distribute, to an OTA master, campaign data including one or more pieces of package data, each of which includes one or more pieces of update software of one or more target ECUs included in a vehicle; determine, after distributing the campaign data, whether a defect involved in an update of the one or more target ECUs is found in the one or more pieces of package data included in the campaign data; and transmit, when determining that the defect is found, an application avoidance instruction to the vehicle to which the campaign data is to be applied via the network, the application avoidance instruction instructing the OTA master not to apply a piece of package data in which the defect is found at a timing of applying the campaign data.

5 Claims, 12 Drawing Sheets

- 16
- 101 UPDATE CONTROL PROGRAM
- 102 VEHICLE DATABASE
- 103 CAMPAIGN DEFINITION DATA
- 104 CAMPAIGN DATA
- 105 CAMPAIGN ID
- 106 PACKAGE DATA
- 106 PACKAGE DATA
- 107 DEFECT DATA
- 108 APPLICATION AVOIDANCE TARGET DATA
- 109 PARTIAL AVOIDANCE INSTRUCTION DATA

103

| CAMPAIGN ID (121) | CAMPAIGN CONTENT (122) | APPLICATION TARGET DATA (123) |
|---|---|---|
| 111111111 | ..... | ..... |
| 222222222 | ..... | ..... |
| 333333333 | ..... | ..... |

FIG. 11
| CAMPAIGN ID | TARGET PACKAGE |
|---|---|
| 111111111 | ..... |
| 222222222 | ..... |
| 333333333 | ..... |
FIG. 12
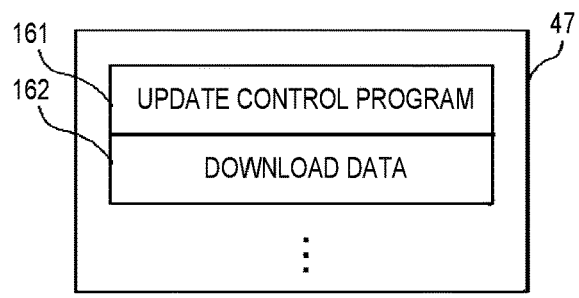
FIG. 13
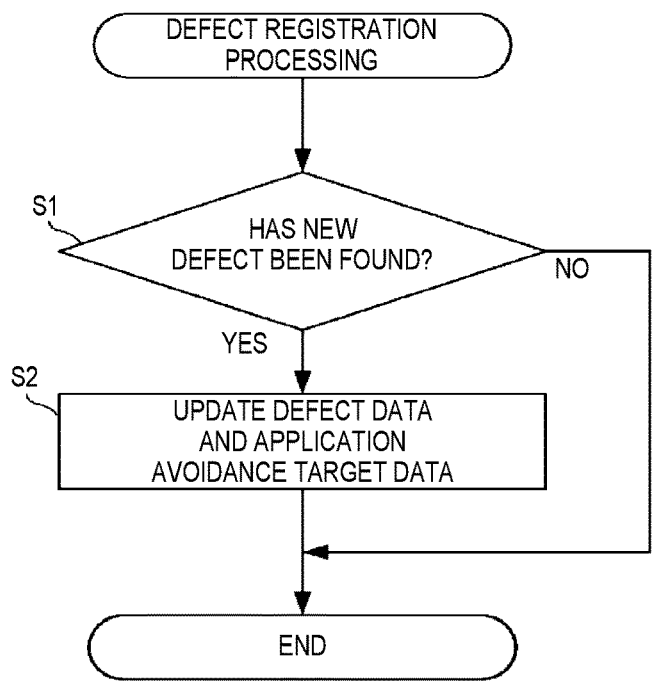

| CAMPAIGN ID | CAMPAIGN CONTENT | APPLICATION TARGET DATA | RELEVANCE DEGREE DATA |
|---|---|---|---|
| 111111111 | ..... | ..... | ..... |
| 222222222 | ..... | ..... | ..... |
| 333333333 | ..... | ..... | ..... |
| ⋮ | ⋮ | ⋮ | ⋮ |

121 122 123 124

CENTER, UPDATE CONTROL METHOD, NON-TRANSITORY STORAGE MEDIUM, AND OTA MASTER

CROSS-REFERENCE TO RELATED APPLICATION

This application claims priority to Japanese Patent Application No. 2021-081819 filed on May 13, 2021, incorporated herein by reference in its entirety.

BACKGROUND

1. Technical Field

The present disclosure relates to a center, an update control method, a non-transitory storage medium, and the OTA master.

2. Description of Related Art

A vehicle is equipped with a plurality of electronic control devices (referred to as "ECUs") used for executing a control function. The ECU includes a processor and a storage unit, and the processor implements the control function of the ECU by executing software stored in the storage unit. Further, a piece of software stored in each ECU can be updated. Specifically, the software can be updated, in a maintenance facility and the like, using an external device, which is connected via a diagnostic connector provided in the vehicle. Further, a communication device included in an in-vehicle network is wirelessly connected to a communication network, such as the Internet, and the software can also be updated to software that is downloaded from a distribution server provided at an update center via the wireless communication (see, for example, Japanese Unexamined Patent Application Publication No. 2020-004245). The update service via the wireless communication is referred to as an over-the-air (OTA) service.

In update processing in the OTA service, pieces of package data including one or more pieces of update software used for updating software of a predetermined ECU (referred to as a target ECU) to be updated are distributed in an event unit referred to as a "campaign". Examples of the package data include "package data for autonomous driving control" including three pieces of update software, that is, update software for an accelerator ECU, update software for a handle ECU, and update software for a brake ECU, and "package data for window control" including update software for a window control ECU. One campaign can include a plurality of pieces of package data. More specifically, the pieces of package data are arranged by distribution dates and times and generated as pieces of campaign data, and the campaign data is distributed to the vehicle.

SUMMARY

Here, it is assumed that defects are found in some pieces of package data included in certain campaign data after the distribution of the campaign data. In such a case, the distribution of the campaign data itself has been stopped. For this reason, when a piece of package data including a piece of update software that does not have any defects but is of high importance is included in such campaign data, there is a concern in which application of the piece of (package data including) update software that is of high importance has been delayed due to a stop in the distribution of the campaign data itself.

The present disclosure provides a center, an update control method, a non-transitory storage medium, and an OTA master capable of promptly executing application of package data including a piece of update software that is of high importance.

A center according to a first aspect of the present disclosure includes one or more processors configured to: communicate with an OTA master included in a vehicle via a network; distribute, to the OTA master, campaign data including one or more pieces of package data, each of which includes one or more pieces of update software of one or more target ECUs included in the vehicle; determine, after distributing the campaign data, whether a defect involved in an update of the one or more target ECUs is found in the one or more pieces of package data included in the campaign data; and transmit, when determining that the defect is found, an application avoidance instruction to the vehicle to which the campaign data is to be applied via the network, the application avoidance instruction instructing the OTA master not to apply a piece of package data in which the defect is found at a timing of applying the campaign data.

An update control method according to a second aspect of the present disclosure is executed by a computer of a center configured to communicate with an OTA master included in a vehicle via a network. The update control method includes: distributing, to the OTA master, campaign data including one or more pieces of package data, each of which includes one or more pieces of update software of one or more target ECUs included in the vehicle; determining, after distributing the campaign data, whether a defect involved in an update of the one or more target ECUs is found in the one or more pieces of package data included in the campaign data; and transmitting, when determining that the defect is found, an application avoidance instruction to the vehicle to which the campaign data is to be applied via the network, the application avoidance instruction instructing the OTA master not to apply a piece of package data in which the defect is found at a timing of applying the campaign data.

A non-transitory storage medium according to a third aspect of the present disclosure stores instructions that are executable by a computer of a center which includes at least a processor and a memory and is configured to communicate with an OTA master included in a vehicle via a network, and that cause the computer to execute the update control method according to the second aspect.

An OTA master according to a fourth aspect of the present disclosure is connected to an in-vehicle network including a plurality of ECUs. The OTA master includes one or more processors configured to: communicate with a center via a network; transmit, to the center, an update inquiry on whether campaign data exists, the campaign data including one or more pieces of package data, each of which includes one or more pieces of update software of one or more target ECUs of which software is an object of updating among the plurality of ECUs; receive the campaign data from the center when the campaign data exists as a result of the update inquiry; transmit, to the center, an application avoidance inquiry on whether the one or more pieces of package data included in the received campaign data include a piece of package data of which applying needs to be avoided; update one or more pieces of software of the one or more target ECUs using the one or more pieces of package data included in the campaign data; and update, when receiving an application avoidance instruction from the center as a result of the application avoidance inquiry, the one or more pieces of software of the one or more target ECUs such that a predetermined piece of package data indicated in the application avoidance instruction is not applied, the application avoidance instruction instructing the OTA master not to apply a part of the one or more pieces of package data included in the campaign data.

With each aspect of the present disclosure, even when predetermined campaign data includes a piece of package data that has a defect and a piece of package including a piece of update software that does not have any defects but is of high importance, application of the package that does not have any defects can be executed while avoiding application of only the package that has a defect. Thus, it is possible to promptly execute application of a piece of update software that is of high importance.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 11 is an example of a data composition of application avoidance target data;

FIG. 12 is a memory map illustrating an example of data stored in a storage unit of the OTA master;

FIG. 13 is a flowchart illustrating details of defect registration processing according to a first embodiment;

FIG. 16 is an example of a data composition of campaign definition data according to a second embodiment;

DETAILED DESCRIPTION OF EMBODIMENTS

Hereinafter, embodiments of the technology of the present disclosure will be described in detail with reference to drawings.

First Embodiment

First, a first embodiment will be described. In the first embodiment, the following processing is executed. After distribution of certain campaign data is started, when a defect is found in a predetermined piece of package data (hereinafter, simply referred to as a package) included in the campaign data, for example, an original equipment manufacturer (OEM) sends a notification indicating that the defect is found to an OTA center (hereinafter, simply referred to as a center). The center stores information on the defect. Then, when the OTA master inquires of the center on the presence/absence of a software update (hereinafter, referred to as an update inquiry), in a case where an update exists, the center distributes campaign data including one or more packages. At this time, the center transfers, to the OTA master, information on the package that has a defect (hereinafter, referred to as a defective package). Based on the information, the OTA master executes application of each package included in the predetermined campaign data while avoiding application of the defective package.

Configuration of Overall System of First Embodiment

Figure 1:
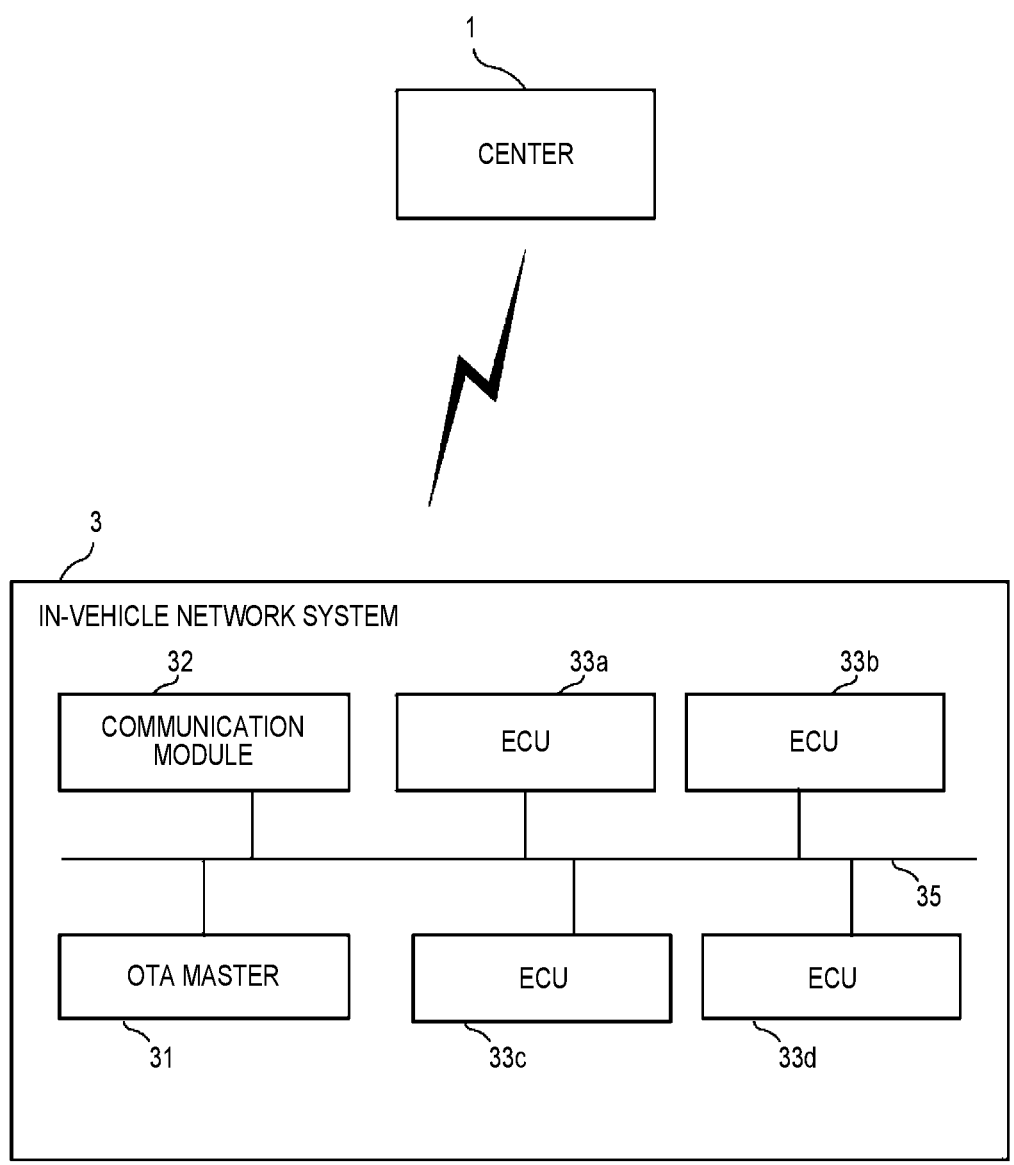
FIG. 1 is a block diagram illustrating an overall configuration of a system according to the present embodiment.

Next, a configuration of an update control system in the first embodiment will be described. FIG. 1 is a block diagram illustrating an overall configuration of the update control system according to the first embodiment. The update control system includes a center 1 and a vehicle 3.

The center 1 is a server used for managing an update of software of an electronic control unit (hereinafter, referred to as an ECU) included in the vehicle 3 (more accurately, the center 1 is a central system including such a server, but hereinafter, for convenience of description, it is described as a server). The center 1 can communicate with the vehicle 3 (an OTA master 31).

The vehicle 3 has an in-vehicle network system mounted thereon. The in-vehicle network system can communicate with the center 1. The in-vehicle network system includes at least the OTA master (a software update device) 31, a communication module 32, and a plurality of ECUs 33a to 33d.

The OTA master 31 is connected to the communication module 32 and the ECUs 33a to 33d via a bus 35. The OTA master 31 can wirelessly communicate with the center 1 via the communication module 32. The OTA master 31 executes control of software update processing of each ECU 33 while transmitting and receiving predetermined data to and from the center 1. In other words, the OTA master 31 has a software update function. The communication module 32 is a communication device that connects to a predetermined network (such as a telephone network or an Internet network).

The ECUs 33a to 33d execute control of an operation of each part of the vehicle 3. The number of ECUs 33 in FIG. 1 is merely an example.

Configuration of Center

Figure 2:
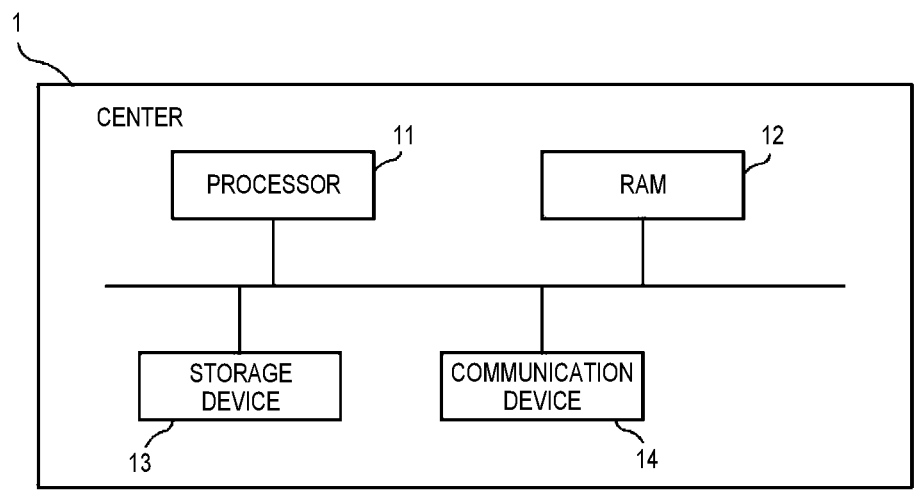
FIG. 2 is a block diagram illustrating a schematic configuration of a center.

FIG. 2 is a block diagram illustrating a schematic configuration of the center 1. As illustrated in FIG. 2, the center 1 includes a processor 11, a RAM 12, a storage device 13, and a communication device 14. The storage device 13 includes a readable and writable storage medium, such as a hard disk or an SSD, and stores various programs or pieces of data necessary for processing according to the present embodiment. In the center 1, the processor 11 executes predetermined control processing by executing a program read from the storage device 13 using the RAM 12 as a work area. The number of processors 11 is not limited to one. The communication device 14 is a device that communicates with the vehicle 3 via a network.

Configuration of OTA Master

Figure 3:
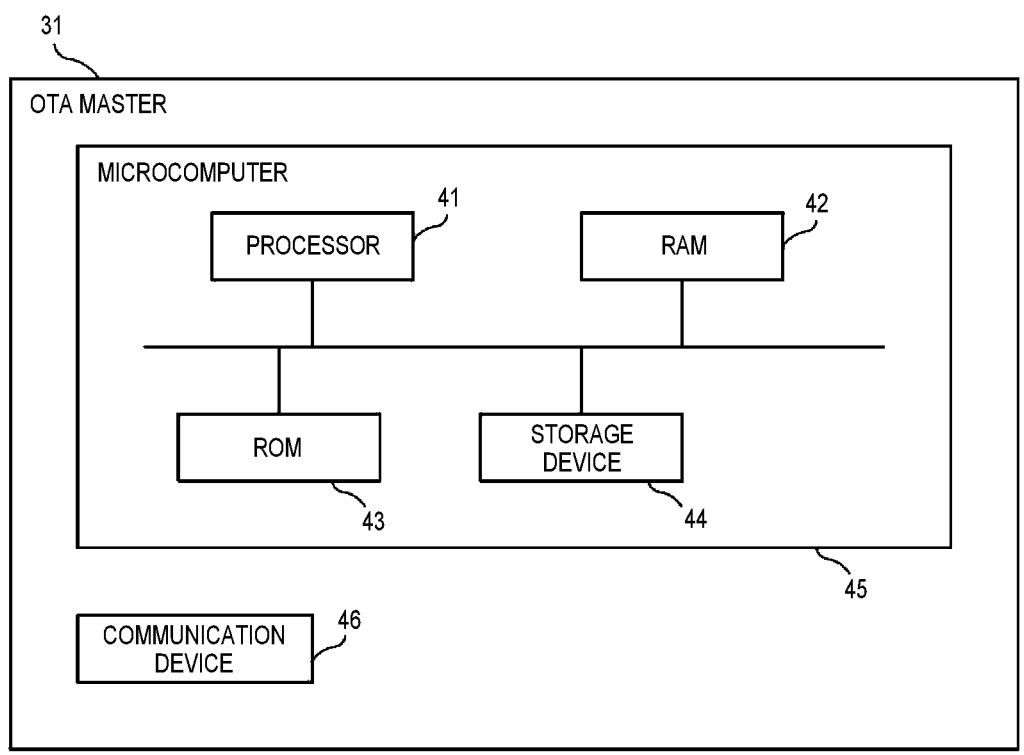
FIG. 3 is a block diagram illustrating a schematic configuration of an OTA master.

FIG. 3 is a block diagram illustrating a schematic configuration of the OTA master 31. As illustrated in FIG. 3, the OTA master 31 includes a microcomputer 45 including a processor 41, a RAM 42, a ROM 43, and a storage device 44, and a communication device 46. In the OTA master 31, the processor 41 of the microcomputer 45 executes predetermined control processing by executing a program read from the ROM 43 using the RAM 42 as a work area. The number of processors 41 is not limited to one. The communication device 46 is a device that communicates with the communication module 32 and the ECUs 33a to 33d via the bus 35, as illustrated in FIG. 1.

Functional Block Diagram of Center

Figure 4:
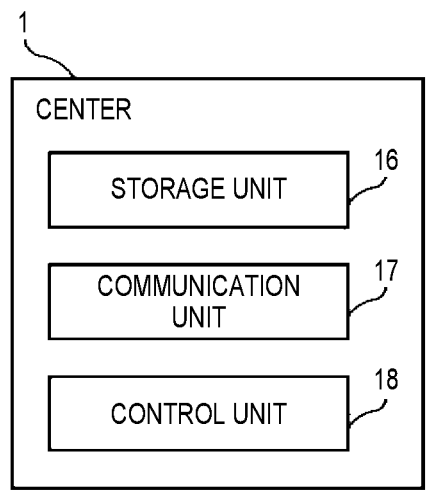
FIG. 4 is a functional block diagram of the center.

FIG. 4 is a functional block diagram of the center 1. The center 1 includes a storage unit 16, a communication unit 17, and a control unit 18. Functions of the communication unit 17 and the control unit 18 are implemented when the processor 11 illustrated in FIG. 2 executes a program stored in the storage device 13 using the RAM 12, and a function of the storage unit 16 is implemented by the storage device 13 illustrated in FIG. 2.

The storage unit 16 stores a program or data used in processing according to the present embodiment.

The control unit 18 transmits and receives predetermined data to and from the OTA master 31 using the communication unit 17, and executes the software update processing.

Functional Block Diagram of OTA Master

Figure 5:
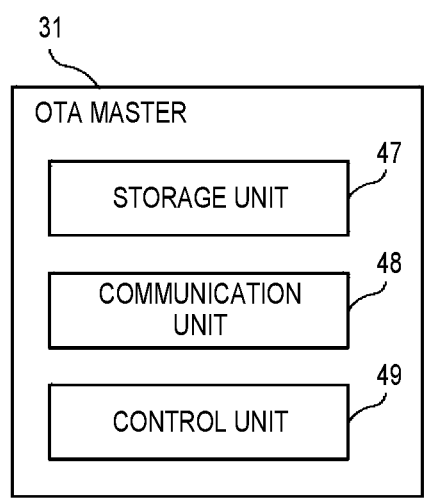
FIG. 5 is a functional block diagram of the OTA master.

FIG. 5 is a functional block diagram of the OTA master 31 illustrated in FIG. 3.

The OTA master 31 includes a storage unit 47, a communication unit 48, and a control unit 49. A function of the storage unit 47 is implemented by the storage device 44 illustrated in FIG. 3, and functions of the communication unit 48 and the control unit 49 are implemented when the processor 41 illustrated in FIG. 3 executes a program stored in the ROM 43 using the RAM 42.

The storage unit 47 stores various programs or various pieces of data used for executing the software update processing.

The control unit 49 communicates with the center 1 via the communication unit 48 and executes various types of control on the software update processing. Specifically, the control unit 49 makes an inquiry on the presence/absence of an update and, when an update exists, downloads the data related to the campaign. Further, the control unit 49 also makes an inquiry of the center 1 on the presence/absence of a defective package and, according to the content of a response, executes the update processing while avoiding the application of only a defective package.

Hereinafter, details of the processing according to the first embodiment will be described.

Data Used in Center

Figures 6, 7:
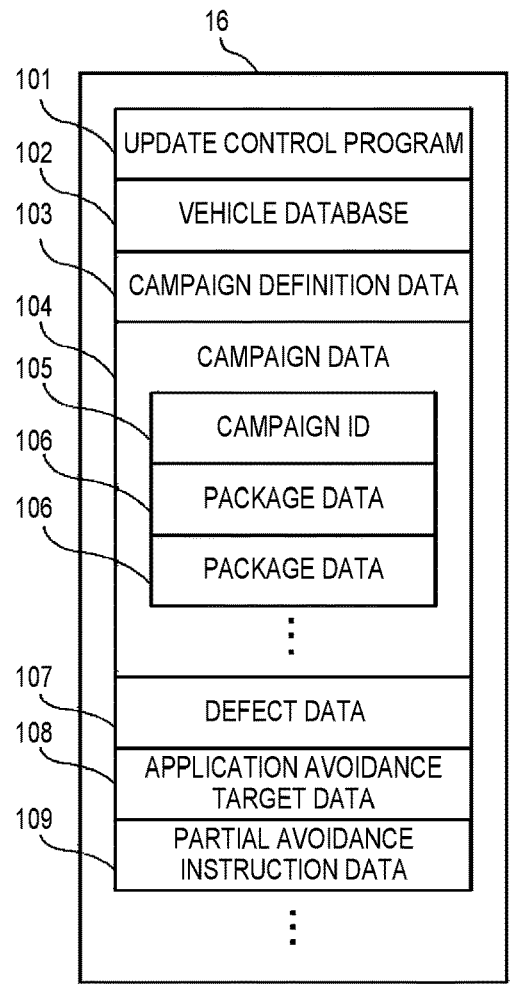
FIG. 6 is a memory map illustrating an example of data stored in a storage unit of the center.
FIG. 7 is an example of a data composition of campaign definition data.

First, data used in processing of the center 1 will be described. FIG. 6 is a memory map illustrating an example of data stored in a storage unit 16 of the center 1. The storage unit 16 stores an update control program 101, a vehicle database 102, campaign definition data 103, campaign data 104, defect data 107, application avoidance target data 108, and the like. Further, other than these, although not shown, the storage unit 16 also stores various programs or data used for implementing an OTA service.

The update control program 101 is a program used for controlling the software update processing according to the present embodiment.

The vehicle database 102 is a database of the vehicle 3 managed by the center 1, and specifically, is a database in which information on the vehicle 3 to which the OTA service is provided is registered. Although not shown, the vehicle database 102 includes a vehicle identification number (VIN) used for identifying each vehicle 3, data indicating an update history, or the like.

Figure 8:
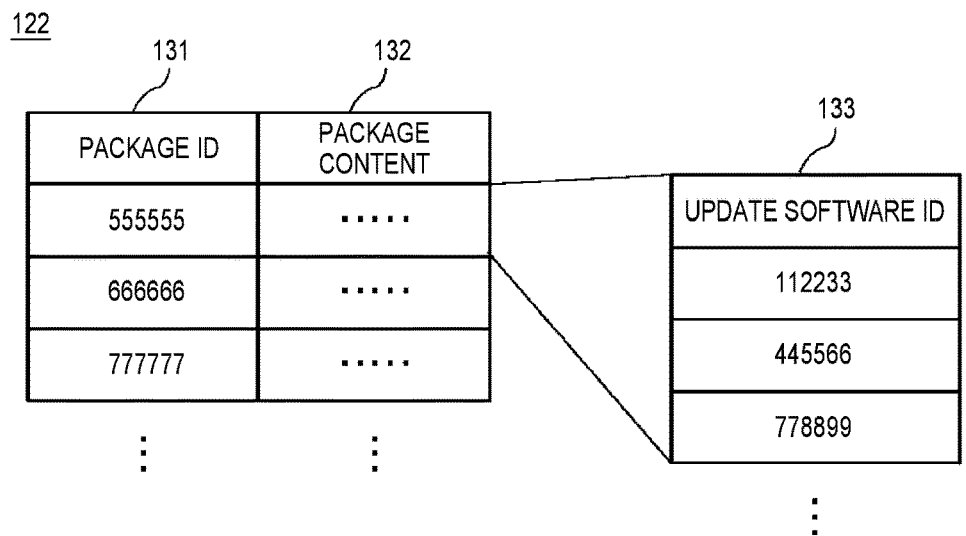
FIG. 8 is an example of a data composition of the campaign content.

The campaign definition data 103 is data that defines the content of the above-described campaign. FIG. 7 is an example of a data composition of the campaign definition data 103. The campaign definition data 103 is data in a table format including at least items of a campaign ID 121, the campaign content 122, and application target data 123. The campaign ID 121 is an ID used for uniquely identifying the campaign as described above. The campaign content 122 is data on a package included in (the campaign data 104 corresponding to) a predetermined campaign. For example, the campaign content 122 has a data composition as illustrated in FIG. 8. In FIG. 8, the campaign content 122 includes items of a package ID 131 and package content 132. The package ID 131 is an ID used for identifying each package. The package content 132 is data that defines one or more update software IDs 133 used for specifying the update software included in the package.

Returning to FIG. 7, the application target data 123 is data that defines a target to which a predetermined campaign is applied. For example, the application target data 123 defines information, such as a vehicle type to which the campaign needs to be applied.

Figure 9:
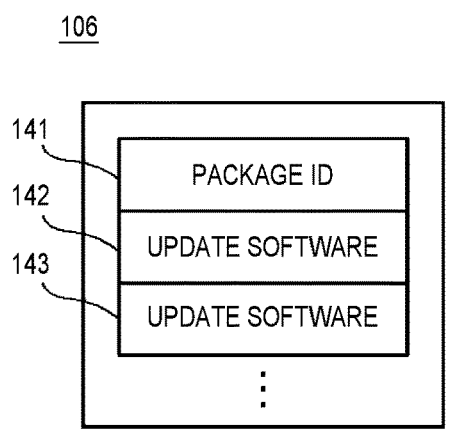
FIG. 9 is an example of a data composition of package data.

Returning to FIG. 6, next, the campaign data 104 is data generated based on the definition content of the campaign definition data 103, and is data to be distributed to the OTA master 31 as a campaign. In FIG. 6, for convenience of description, only one piece of campaign data 104 is exemplified, but a plurality of pieces of campaign data 104 can be stored in the storage unit 16 according to the number of campaigns. One piece of campaign data 104 includes a campaign ID 105 and one or more pieces of package data 106 according to the definition content of the campaign definition data 103. The campaign ID 105 is an ID corresponding to the campaign ID 121 of the campaign definition data 103. The package data 106 is specific data of the package included in the campaign. FIG. 9 illustrates an example of a data composition of the package. Each piece of package data 106 includes a package ID 141 and one or more pieces of update software 142, 143. The package ID 141 is an ID corresponding to the package ID 131 of the campaign content 122. Further, although not shown, each piece of update software 142, 143 includes an update software ID corresponding to the update software ID 133 of the campaign content 122 and data that is a main body of update software of a target ECU.

Figure 10:
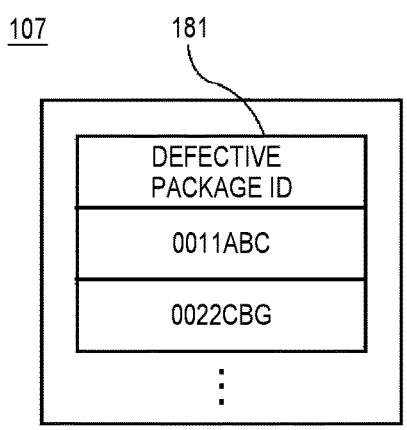
FIG. 10 is an example of a data composition of defect data.

Returning to FIG. 6, next, the defect data 107 is data on the defective package. For example, the content is added to the defect data 107 in response to the receipt of a notification on the defective package from an OEM. FIG. 10 is an example of a data composition of the defect data 107. The defect data 107 stores a defective package ID 181 which is information used for specifying the defective package.

The application avoidance target data 108 is data that can be generated based on the defect data 107, and is data used for specifying a defective package of which application for the update needs to be avoided for each campaign. FIG. 11 is a diagram illustrating an example of a data composition of the application avoidance target data 108. The application avoidance target data 108 is data in a table format including at least a campaign ID 151 and a target package 152. The campaign ID 151 is an ID used for specifying the campaign data 104. The target package 152 is data indicating information (the defective package ID 181) used for specifying the defective package in the predetermined campaign data 104. Further, when a plurality of defective packages of which application needs to be avoided exists, information on each of the plurality of packages is defined in order to specify them individually.

Partial avoidance instruction data 109 is data used for giving, to the OTA master 31, an instruction to avoid application of a predetermined defective package. The partial avoidance instruction data 109 includes information (the defective package ID 181) that specifies the defective package. Further, since the partial avoidance instruction data 109 is transmitted to individual OTA masters 31, the storage unit 16 (temporarily) stores a plurality of pieces of partial avoidance instruction data 109 corresponding to the individual OTA masters 31.

Data Used in OTA Master

Next, data used in the OTA master 31 will be described. FIG. 12 is a memory map illustrating an example of data stored in a storage unit 47 of the OTA master 31. The storage unit 47 of the OTA master 31 stores at least an update control program 161 and download data 162. In addition, although not shown, the storage unit 47 also stores various programs or data used for implementing the OTA service.

The update control program 161 is a program used for the OTA master 31 to execute processing according to the present embodiment.

The download data 162 is data that (temporarily) stores the predetermined campaign data 104 distributed from the center 1. The OTA master 31 executes the update processing based on the download data 162.

In addition, although not shown, the storage unit 47 also stores the partial avoidance instruction data 109 and the like transmitted from the center 1.

Processing Flow of First Embodiment

Next, a processing flow of the first embodiment will be described. First, processing executed in the center 1 will be described, and then processing executed in the OTA master 31 will be described.

FIG. 13 is a flowchart illustrating details of the defect registration processing executed in the center 1. The processing can be repeatedly executed in the center 1 at, for example, a predetermined timing. Further, in the present embodiment, a case is exemplified in which, when a defect is found in a predetermined package, information on the defect is transmitted from the OEM server, which is a developer of the package, to the center 1 by server-to-server communication. In FIG. 13, first, in step S1, the control unit 18 determines whether a new defect has been found in the predetermined package. In the present embodiment, it is determined whether the information on the defect has been received from the OEM server as described above. When it has been received, the control unit 18 determines that a new defect has been found. As a result of the determination, when a new defect has been found (YES in step S1), in step S2, the control unit 18 updates the content of the defect data 107 based on the received information. Specifically, the control unit 18 registers the defective package ID 181 that specifies a new defective package in the defect data 107. Further, the control unit 18 refers to the campaign definition data 103 and extracts the campaign ID 121 including the newly found defective package. Then, the control unit 18 updates the content of the application avoidance target data 108 based on the extracted campaign ID 121 and the content of the defect data 107. In other words, the control unit 18 adds, to the application avoidance target data 108, the data in which the extracted campaign ID 121 is set as the campaign ID 151 of the application avoidance target data 108 and the newly found defective package ID 181 is set as the target package 152. Thereafter, the control unit 18 ends the defect registration processing.

On the other hand, as a result of the determination in step S1, when no new defect is found (NO in step S1), the control unit 18 skips the process of step S2 and ends the defect registration processing.

Regarding the defect registration processing, in the present embodiment, the example in which information on the defect is transmitted from a predetermined OEM server to the center 1 is described. The examples are not limited thereto. In another embodiment, the processing may be executed such that the content of the defect data 107 and the application avoidance target data 108 is updated in a manual operation by an operator and the like.

Figure 14:
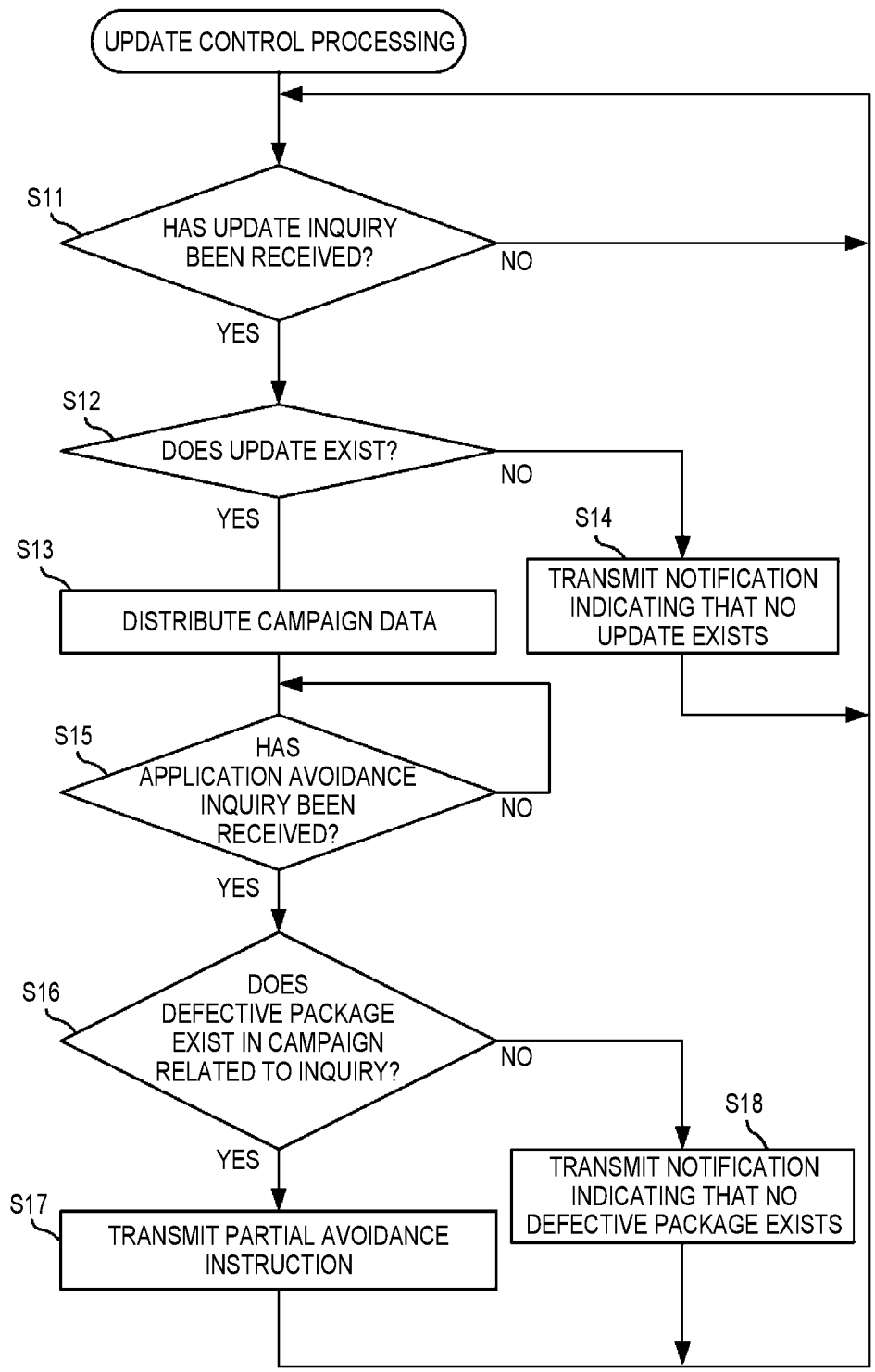
FIG. 14 is a flowchart illustrating details of update control processing according to the first embodiment.

Next, FIG. 14 is a flowchart illustrating details of the defect control processing executed in the center 1. In FIG. 14, first, in step S11, the control unit 18 determines whether it has received an update inquiry from a predetermined OTA master 31. When it has not received the update inquiry (NO in step S11), the control unit 18 continues to wait for the update inquiry by repeating a process of step S11. On the other hand, when it has received the update inquiry (YES in step S11), in step S12, the control unit 18 determines whether an update for the vehicle 3, which is a source of transmission of the update inquiry (hereinafter, referred to as an update inquiry source vehicle), exists. Specifically, the control unit 18 determines whether the campaign data 104 that can be distributed exists based on the vehicle database 102 and the campaign definition data 103. For example, the control unit 18 determines the presence/absence of the update based on an update history of the update inquiry source vehicle. As a result of the determination, when no update exists, that is, when no campaign data 104 that can be distributed exists (NO in step S12), in step S14, the control unit 18 transmits a notification indicating that no new update exists to an OTA master 31 of the update inquiry source vehicle. Thereafter, the control unit 18 returns to step S11 and repeats the processes.

On the other hand, as a result of the determination in step S12, when campaign data 104 that can be distributed exists (YES in step S12), in step S13, the control unit 18 distributes the campaign data 104 to the OTA master 31 of the update inquiry source vehicle.

Next, in step S15, the control unit 18 determines whether it has received an inquiry on the presence/absence of an application avoidance target (hereinafter, referred to as an application avoidance inquiry) from the OTA master 31 to which the campaign data 104 has been distributed. The application avoidance inquiry has the content indicating an inquiry on whether a defective package of which application needs to be avoided exists in the distributed campaign data 104. The application avoidance inquiry may include information, such as the campaign ID 151 to be inquired on. As a result of the determination, when the control unit 18 has not received the application avoidance inquiry (NO in step S15), it continues to wait to receive the application avoidance inquiry. On the other hand, when the control unit 18 has received the application avoidance inquiry (YES in step S15), in step S16, it refers to the application avoidance target data 108 and determines whether a defective package exists in the campaign ID 151 related to the application avoidance inquiry. As a result of the determination, when no defective package exists (NO in step S16), in step S18, the control unit 18 transmits a notification indicating that no defective package exists to the OTA master 31 of the vehicle 3, which is the source of the transmission of the application avoidance inquiry (hereinafter, an application avoidance inquiry source vehicle). Thereafter, the control unit 18 returns to step S11 and repeats the processes.

On the other hand, as a result of the determination in step S16, when a defective package exists (YES in step S16), in step S17, the control unit 18 generates the partial avoidance instruction data 109 including information indicating the defective package based on the application avoidance target data 108. Then, the control unit 18 transmits the partial avoidance instruction data 109 to the OTA master 31 of the avoidance inquiry source vehicle. Thereafter, the control unit 18 returns to step S11 and repeats the processes.

This is the end of the description of the processing executed in the center 1.

Figure 15:
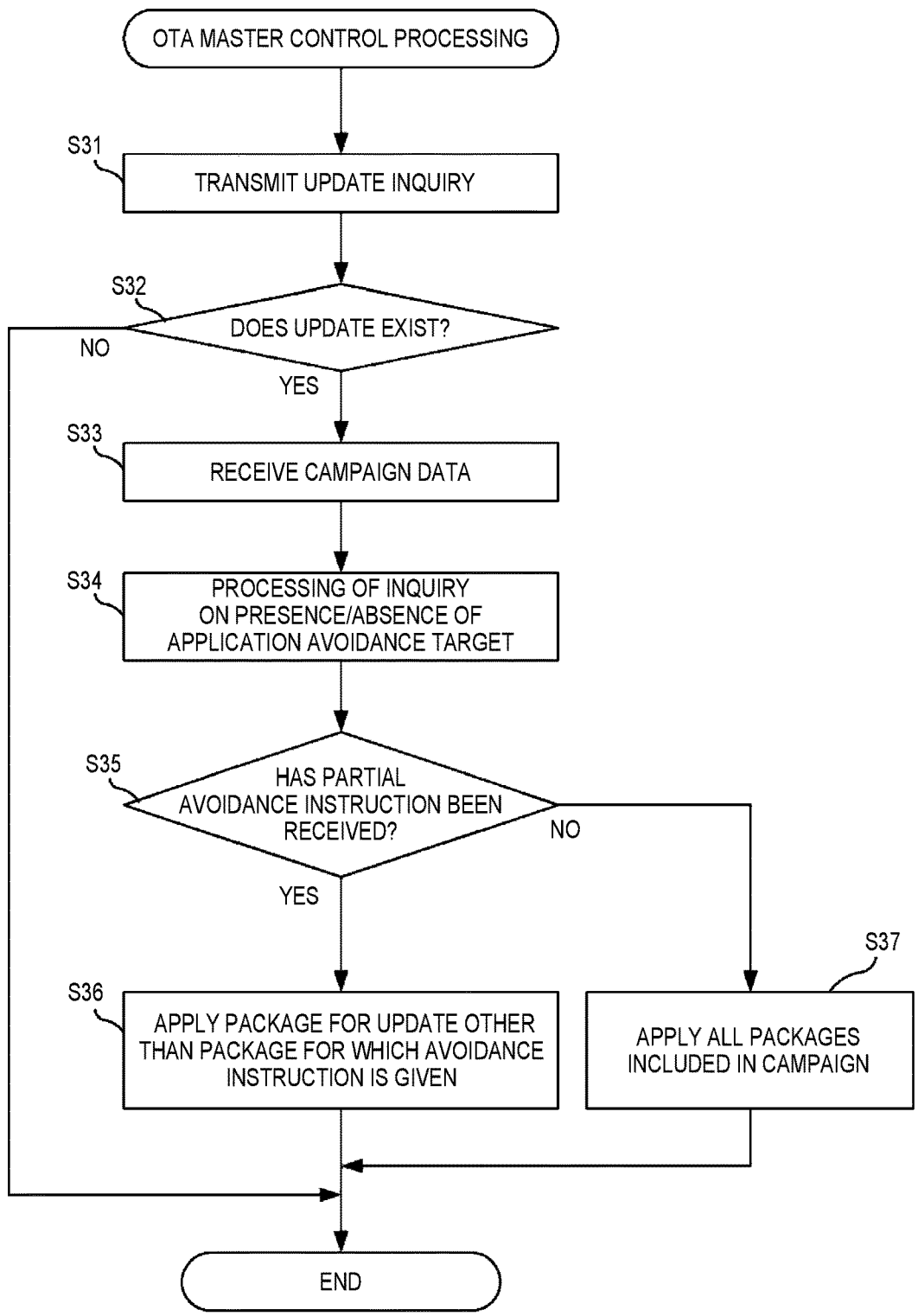
FIG. 15 is a flowchart illustrating details of OTA master control processing according to the first embodiment.

Next, processing executed in the OTA master 31 will be described. FIG. 15 is a flowchart illustrating details of OTA master control processing executed in the OTA master 31. The processing is executed at a timing at which ignition is turned on, for example, once every two weeks. In FIG. 15, first, in step S31, the control unit 49 of the OTA master 31 generates an update inquiry and transmits it to the center 1.

Next, in step S32, the control unit 49 receives response data to the update inquiry, transmitted from the center 1, and determines whether an update exists, that is, whether the campaign data 104 to be distributed exists. As a result of the determination, when no update exists (NO in step S32), the control unit 49 ends the OTA master control processing.

On the other hand, when an update exists (YES in step S32), in step S33, the control unit 49 receives (downloads) the campaign data 104 from the center 1. After completing the receipt of the campaign data 104, the control unit 49 then generates the application avoidance inquiry in step S34. Then, the control unit 49 transmits the application avoidance inquiry to the center 1.

Next, in step S35, the control unit 49 determines whether it has received the partial avoidance instruction data 109 from the center 1. As a result of the determination, when the control unit 49 has not received the partial avoidance instruction data 109 (in this case, it means that it has received, from the center 1, a notification indicating that no defective package exists), in step S37, it executes update processing in which all the packages included in the campaign data 104 received in step S33 are applied. Then, upon completing the update processing, the control unit 49 ends the OTA master control processing.

On the other hand, as a result of the determination in step S35, when the control unit 49 has received the partial avoidance instruction data 109 (YES in step S35), in step S36, it stores the received partial avoidance instruction data 109 in the storage unit 47. Next, the control unit 49 executes the update processing for applying the packages other than the defective package designated in the partial avoidance instruction data 109 without applying the designated defective package. For example, the control unit 49 may execute control for identifying a package of which the application needs to be avoided from the download data 162 based on the defective package ID 181 included in the partial avoidance instruction data 109, and skipping processing for applying the package. Then, upon completing the update processing, the control unit 49 ends the OTA master control processing.

This is the end of the description of the processing executed in the OTA master 31.

As above, in the first embodiment, the information on the defective package is stored in the center 1, and when the update related to the predetermined campaign is applied, the information on the defective package is transmitted to the OTA master 31. Then, the OTA master 31 executes the update processing based on the information without applying the defective package. As such, even when the predetermined campaign data 104 includes both the package including update software that does not have any defects but is of high importance and the defective package, it is possible to apply the package including update software that is of high importance without stopping the application of the entire campaign data 104.

Second Embodiment

Next, a second embodiment will be described. In the first embodiment, the processing in which only the defective package is not applied is merely executed. On the other hand, in the second embodiment, a determination on application avoidance is made in consideration of a relevance degree between packages included in certain campaign data 104. For example, it is assumed that a package A, a package B, and a package C are included in the certain campaign data 104. Then, it is assumed that a defect is found in the package B from among these packages. Further, in such a case, it is assumed that the relevance degree between the package A and the package B is high. The relevance degree is high when a dependency relationship between packages is high to an extent. For example, in order to implement a function related to the package A, a part of functions of the software included in the package B is used or a processing result of software related to the package B is used. Hereinafter, a relationship in which packages have a high relevance degree is referred to as "tightly coupled", and a relationship in which packages have a low relevance degree is referred to as "loosely coupled". Further, in the present embodiment, it is assumed that, in principle, the packages are "loosely coupled", respectively, but exceptionally "tightly coupled" packages exist.

As above, when the package A and the package B are "tightly coupled", in the first embodiment, only application of the package B, which is a defective package, is avoided. In this case, the package A is updated, but the package B, which is "tightly coupled" with the package A, is not updated. For this reason, there is a possibility that performance of the package A (after the update) that is assumed to use or depend on the function of the package B may not be exhibited. Further, as a result of correcting the defect of the package B, there is possibly also a case where the package A also needs to be further corrected. In this case, it is necessary to update the package A again, which possibly results in inconvenience of updating twice. In other words, there is room for improvement in terms of efficiency of the update processing since, for example, there is a possibility that it does not sufficiently function by itself or it is necessary to update again when update is applied to only one of the "tightly coupled" packages. Therefore, in the second embodiment, for example, the relevance degree between the defective package included in the certain campaign data 104 and the other package is determined. Then, the processing for avoiding the application of the defective package is executed only when the defective package is "loosely coupled" to the other package. For example, in the above example, when the package B is a defective package and is "loosely coupled" to both packages A and C, processing for avoiding application of only package B is executed. On the other hand, when the package B is "tightly coupled" to the package A, the processing for not applying the entire campaign (stopping the application) is executed.

Hereinafter, details of the processing according to the second embodiment will be described. First, since a hardware configuration (the center 1 and the OTA master 31) in the second embodiment is basically the same as that in the first embodiment, detailed description thereof will be omitted.

Next, the data used in the second embodiment will be described. Basically, in the second embodiment, the same data as that in the first embodiment is used, but differences exist in a part of the data composition of the campaign definition data 103 stored in the storage unit 16 of the center 1. Specifically, as illustrated in FIG. 16, the composition of the campaign definition data 103 includes the relevance degree data 124.

The relevance degree data 124 is data that defines "tightly coupled" packages from among the packages included in the predetermined campaign data 104. Specifically, the package IDs 141 of packages having "tightly coupled" relationships are defined. Further, when a plurality of combinations of "tightly coupled" packages exists, each combination is defined so as to be identifiable.

Figure 17:
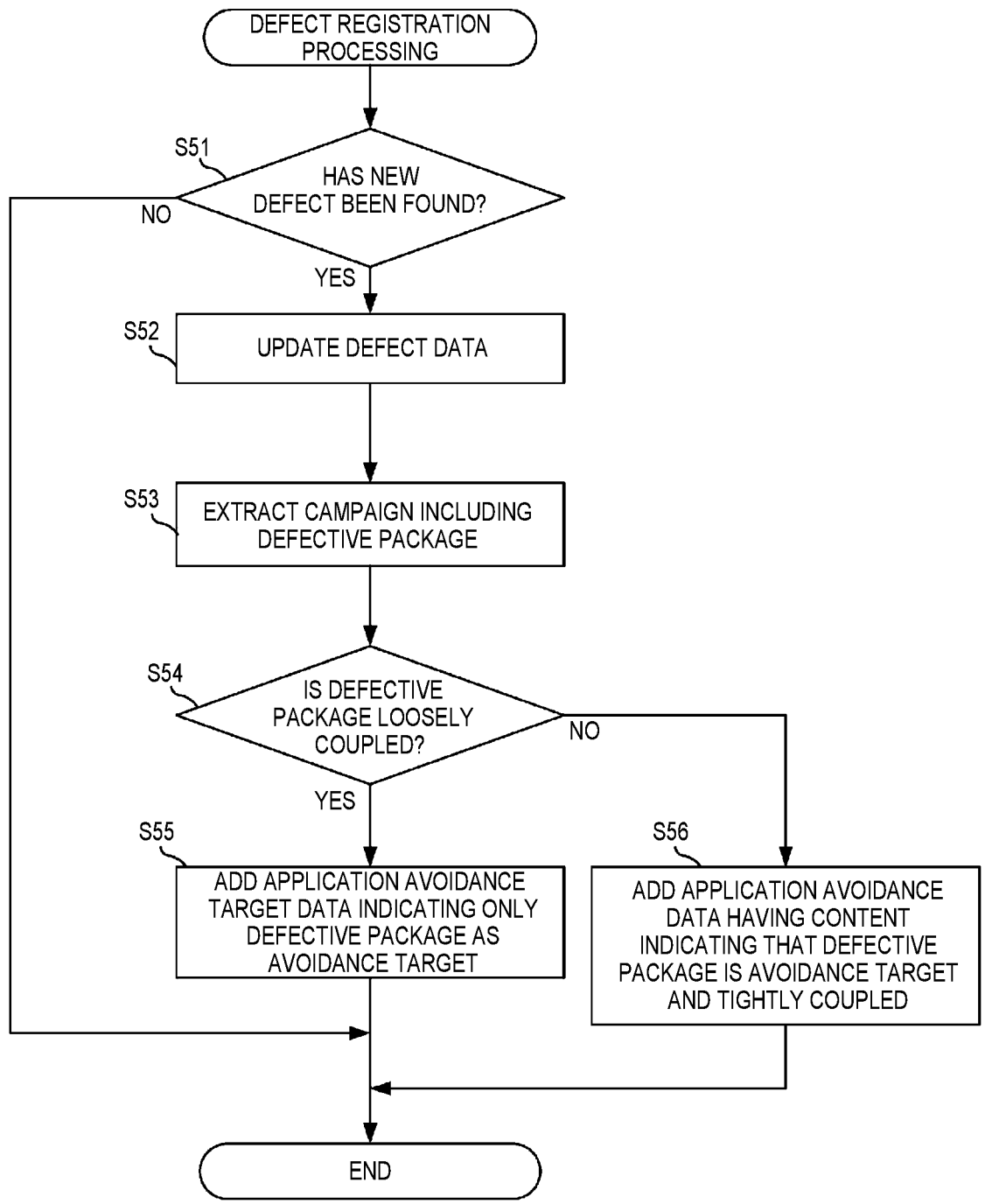
FIG. 17 is a flowchart illustrating details of defect registration processing according to the second embodiment.

Next, a processing flow according to the second embodiment will be described. FIG. 17 is a flowchart illustrating details of the defect registration processing according to the second embodiment. In FIG. 17, first, in step S51, the control unit 18 determines whether a new defect has been found in the predetermined package. This process is the same as that in step S1. As a result of the determination, when no new defect is found (NO in step S51), the control unit 18 ends the defect registration processing. On the other hand, when a new defect is found (YES in step S51), in step S52, the control unit 18 updates the defect data 107 by adding the information on the newly found defective package to the defect data 107.

Next, in step S53, the control unit 18 refers to the campaign definition data 103 and extracts the campaign ID 121 including the defective package.

Next, in step S54, the control unit 18 determines, based on the relevance degree data 124, whether the defective package is "loosely coupled" to other packages for the campaign data 104 corresponding to the extracted campaign ID 121. As a result of the determination, when the defective package is "loosely coupled" to the other package (YES in step S54), the control unit 18 adds, to the application avoidance target data 108, the content in which only the defective package is designated as the application avoidance target for the campaign data 104 including the defective package.

On the other hand, when the defective package is not "loosely coupled" to the other package, that is, "tightly coupled" to any package (NO in step S54), in step S56, the control unit 18 designates the defective package as the application avoidance target and adds, to the application avoidance target data 108, data having the content indicating that the defective package is "tightly coupled" to the other package. The data may be, for example, a flag and the like indicating whether it is "tightly coupled" or "loosely coupled" to two states. This is the end of the defect registration processing according to the second embodiment.

The processes of steps S55 and S56 are not limited to the processes as above. The processes may be executed such that, in the case of "loosely coupled", the instruction content instructing the application of the designated defective package to be avoided is set as the application avoidance target data 108 and stored, and in the case of "tightly coupled", the instruction content instructing the application of the entire campaign to be stopped is set as the application avoidance target data 108 and stored. Then, in this case, the OTA master 31 may control the update processing based on the instruction included in the application avoidance target data 108.

Further, in the same manner as in the first embodiment, in the second embodiment, the processing may also be executed such that the content of the defect data 107 and the application avoidance target data 108 is updated in a manual operation by an operator and the like.

Figure 18:
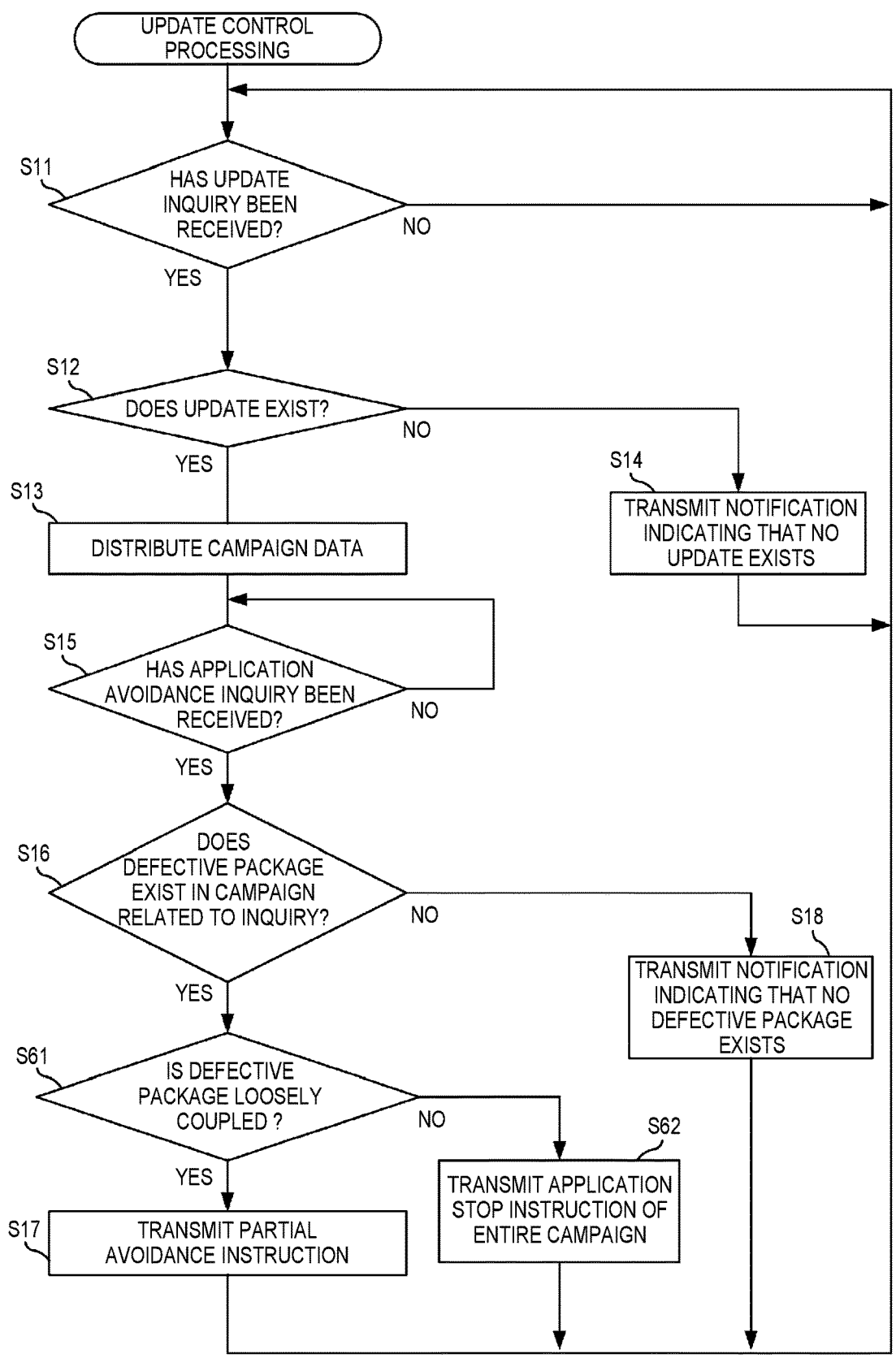
FIG. 18 is a flowchart illustrating details of update control processing according to the second embodiment.

Next, the update control processing executed in the center 1 in the second embodiment will be described. FIG. 18 is a flowchart illustrating details of the update control processing according to the second embodiment. In the flowchart, since the processes of steps S11 to S18 are the same as those described above with reference to FIG. 14, the description thereof will be omitted here, and processes other than these (steps S61 and S62) will be mainly described.

As a result of the determination in step S16 of FIG. 18, when a defective package exists (YES in step S16), in step S61, the control unit 18 refers to the application avoidance target data 108 and determines whether the defective package is "loosely coupled" to the other package. Specifically, when the content indicating that the defective package is "tightly coupled" is indicated in the application avoidance target data 108, the control unit 18 determines that it is not "loosely coupled". When the content does not indicate that it is "tightly coupled", the control unit 18 determines that it is "loosely coupled". As a result of the determination, in the case of "loosely coupled" (YES in step S61), the control unit 18 executes the process of step S17 (transmission of the partial avoidance instruction data 109). On the other hand, when it is not "loosely coupled" (NO in step S61), in step S62, the control unit 18 transmits, to the OTA master 31, an application stop instruction used for stopping the application of the entire campaign.

Figure 19:
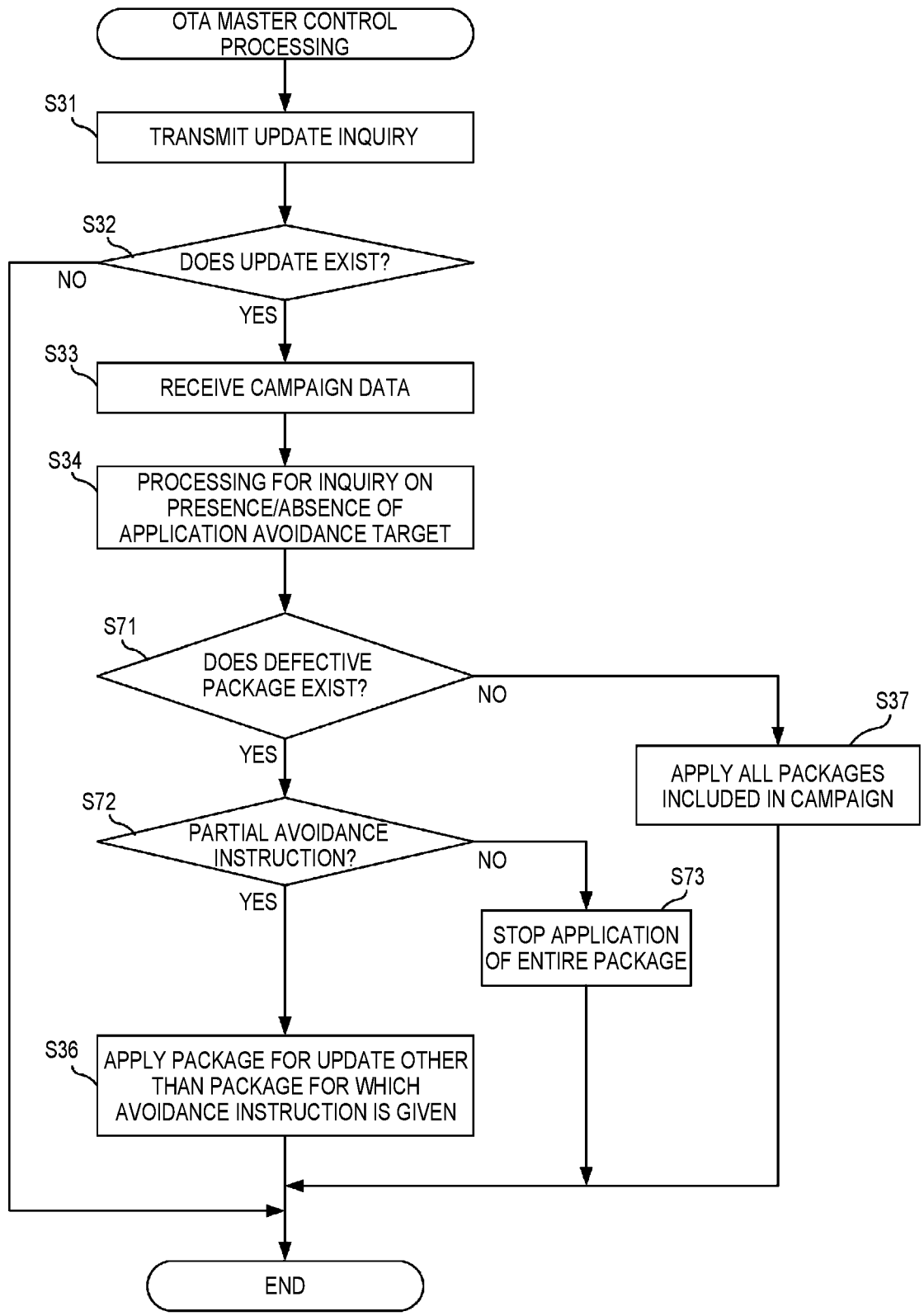
FIG. 19 is a flowchart illustrating details of OTA master control processing according to the second embodiment.

Next, the OTA master control processing in the second embodiment will be described. FIG. 19 is a flowchart illustrating details of the OTA master control processing according to the second embodiment. In FIG. 19, since the processes of steps S31 to S34, S36, and S37 are the same as those described above with reference to FIG. 15, the description thereof will be omitted here, and processes other than these (steps S71 to S73) will be mainly described.

After transmitting the application avoidance inquiry to the center 1 in step S34 of FIG. 19, in step S71, the control unit 49 determines whether a defective package exists based on the data received from the center 1. Specifically, the control unit 49 determines whether it has received a notification indicating that no defective package exists from the center 1, and when it has received the notification, it determines that no defective package exists. On the other hand, when it has not received the notification indicating that no defective package exists, the control unit 49 determines that a defective package exists.

As a result of the determination, when no defective package exists (NO in step S71), the process proceeds to the process of step S37, and the control unit 49 applies all the packages included in the campaign data 104. On the other hand, when a defective package exists (YES in step S71), in step S72, the control unit 49 determines whether the content received from the center 1 is a partial avoidance instruction. As a result of the determination, when the content is a partial avoidance instruction (YES in step S72), the process proceeds to the process of step S36, and the control unit 49 executes the update processing without applying only the defective package for which the avoidance instruction is given. On the other hand, when the content is not a partial avoidance instruction (NO in step S72), it means that the application stop instruction has been received from the center 1. Therefore, in step S73, the control unit 49 executes processing for stopping the application of the entire campaign. For example, the control unit 49 stops the update processing and discards the download data 162.

This is the end of the detailed description of the processing according to the second embodiment.

As above, in the second embodiment, the application avoidance target data 108 is generated in the center 1 in consideration of the relevance degree between the packages included in the predetermined campaign. Then, when a defective package exists and the defective package is "loosely coupled" to the other package, the partial avoidance instruction data 109 used for avoiding only the application of the defective package is transmitted to the OTA master 31. As such, in the OTA master 31, when a certain defective package is "loosely coupled" to the other package, the update processing can be executed such that only the application of the defective package is avoided and the other packages are applied for the update. Further, when the defective package is not "loosely coupled" to the other package, control for stopping the application of the entire campaign is executed. As such, efficient update processing can be executed.

Modified Example

In the second embodiment, when the defective package is "tightly coupled" to the other package, the application of the entire campaign is stopped. In another embodiment, in such a case, control may be executed such that only the application of the defective package and the package having the "tightly coupled" relationship with the defective package is avoided. For example, it is assumed that a certain campaign includes packages A, B, C, and packages A and B are "tightly coupled" to each other. Then, it is assumed that a defect is found in the package B. In this case, control may be executed such that only the application of the packages A and B is avoided and the package C is applied for the update instead of stopping the application of the entire campaign.

Further, in each of the above embodiments, an example where the application avoidance inquiry is made after receiving the campaign data 104 is described. The examples are not limited thereto and, in another embodiment, the application avoidance inquiry may be made before the receipt of the campaign data 104 is started. Further, in this case, control may be executed such that the package data 106 related to the package of the application package avoidance target is not transmitted from the center 1. As such, it is possible to reduce a communication amount and also execute efficient communication.

Further, the application avoidance instruction data may be notified via a network separate from the network used in the OTA service. For example, the OTA service may be used on the Internet network, and the application avoidance instruction data may be notified via a carrier network, such as SMS or V2X. Then, upon receiving such application avoidance instruction data when applying the campaign, the OTA master 31 may execute the update processing based on the application avoidance instruction data such that the application of the defective package is avoided.

As above, although one embodiment of the technology of the present disclosure has been described, the present disclosure can be regarded not only as a center but also as an update control method executed by a computer of an OTA center including at least a processor and a memory and communicable with an in-vehicle network, an update program of the method, a computer-readable non-transitory storage medium storing the update program, an OTA master, and the like.

The technology of the present disclosure can be used for a center capable of communicating with an OTA master included in a vehicle via a network.

What is claimed is:

1. A center comprising one or more processors configured to:
communicate with an over-the-air (OTA) master included in a vehicle via a network;
distribute, to the OTA master, campaign data including one or more pieces of package data, each of which includes one or more pieces of update software of one or more target electronic control units (ECUs) included in the vehicle;
determine, after distributing the campaign data, whether a defect involved in an update of the one or more target ECUs is present in the one or more pieces of package data included in the campaign data;
determine whether a relevance degree is low between a defective piece of package data, in which the defect is present, and another piece of package data in the campaign data including the defective piece of package data in response to a determination that the defect is present in the one or more pieces of package data, wherein the relevance degree is determined to be low when a function of software related to one of i) the defective piece of package data and ii) the other piece of package data is realized using neither a calculation result nor a part of a function of software related to the other one of i) the defective piece of package data and ii) the other piece of package data; and
transmit an application avoidance instruction to the vehicle to which the campaign data is to be applied via the network, the application avoidance instruction instructing the OTA master not to apply the defective piece of package data at a timing of applying the campaign data.

2. The center according to claim 1, wherein the one or more processors are configured to, upon determining that the relevance degree is high, transmit an instruction to stop application of the campaign data to the vehicle.

3. The center according to claim 1, wherein the one or more processors are configured to:
receive, after distributing the campaign data, an inquiry on whether the campaign data includes a piece of package data of which applying needs to be avoided; and
determine, in response to receiving the inquiry, whether the defect is present in the one or more pieces of package data.

4. An update control method executed by a computer of a center configured to communicate with an over-the-air (OTA) master included in a vehicle via a network, the update control method comprising:
- distributing, to the OTA master, campaign data including one or more pieces of package data, each of which includes one or more pieces of update software of one or more target electronic control units (ECUs) included in the vehicle;
- determining, after distributing the campaign data, whether a defect involved in an update of the one or more target ECUs is present in the one or more pieces of package data included in the campaign data;
- determining whether a relevance degree is low between a defective piece of package data, in which the defect is present, and another piece of package data in the campaign data including the defective piece of package data in response to a determination that the defect is present in the one or more pieces of package data, wherein the relevance degree is determined to be low when a function of software related to one of i) the defective piece of package data and ii) the other piece of package data is realized using neither a calculation result nor a part of a function of software related to the other one of i) the defective piece of package data and ii) the other piece of package data; and
- transmitting an application avoidance instruction to the vehicle to which the campaign data is to be applied via the network, the application avoidance instruction instructing the OTA master not to apply the defective piece of package data at a timing of applying the campaign data.

5. A non-transitory storage medium storing instructions that are executable by a computer of a center which includes at least a processor and a memory and is configured to communicate with an OTA master included in a vehicle via a network, and that cause the computer to execute the update control method according to claim 4.

* * * * *